US006721365B1

United States Patent
Yin et al.

(10) Patent No.: US 6,721,365 B1
(45) Date of Patent: Apr. 13, 2004

(54) RECEIVER FOR A HOME PHONE-LINES LAN SYSTEM

(76) Inventors: Shih-chung Yin, 6F, No. 590, lane 640, Chung Shan Rd., Hsin Chu 300 (TW); Ching-kae Tzou, 3F, No. 113, San Chung 1 Rd., San Lin, San Chung Li, Chu Tung Chen, Hsin Chu County (TW)

( * ) Notice: Subject to any disclaimer, the term of this patent is extended or adjusted under 35 U.S.C. 154(b) by 0 days.

(21) Appl. No.: 09/551,450

(22) Filed: Apr. 18, 2000

(51) Int. Cl.[7] .................................................. H04L 5/12
(52) U.S. Cl. ..................... 375/261; 375/343; 375/368
(58) Field of Search ................................ 375/142, 143, 375/150, 152, 235, 261, 316, 324, 340, 343, 364, 365, 368, 229, 232, 354, 145, 149; 329/304, 308, 358; 370/509, 512, 520

(56) References Cited

U.S. PATENT DOCUMENTS 5,251,233 A * 10/1993 Labedz et al. ............... 375/230
5,970,092 A * 10/1999 Currivan ..................... 375/232
6,396,953 B1 * 5/2002 Abbey ......................... 382/218

* cited by examiner

*Primary Examiner*—Stephen Chin
*Assistant Examiner*—Dac V. Ha
(74) *Attorney, Agent, or Firm*—Bacon & Thomas, PLLC

(57) ABSTRACT

A receiver in a home phone-lines local area network system is proposed. The receiver can distinguish a valid signal and a collision backoff signal from noises in real time. The receiver for a home phone-lines LAN system comprises a QAM demodulator, an equalizer, a deconstellation, and a transmission data reading device. The receiver further comprises a signal match filter module and a detector. The signal match filter module comprises an adder and at least a cross-correlator. The adder adds the "I" signal and "Q" signal outputted from the QAM demodulator and outputs a combined signal. The cross-correlator performs match operation, such as a comparison operation or a correlation operation, of the combined signal and an identification value and outputs a match value to the detector. Since the signal match filter module connects directly to the output of QAM demodulator, it can immediately identify the identification code TRN16 contained in the received signal. The detector compares the match value with a threshold value and determines whether the received signal frame is a collision backoff signal frame or a valid signal frame. When continuous identification codes TRN16 are detected, the received signal frame is a valid signal frame; whereas when a single identification code TRN16 is detected, the received signal frame is a collision backoff signal frame.

8 Claims, 5 Drawing Sheets

RECEIVER FOR A HOME PHONE-LINES LAN SYSTEM

BACKGROUND OF THE INVENTION

1. Field of Invention

The present invention relates to a receiver for a LAN system and, more particularly, to a receiver installed in a computer for receiving signals transmitted in a home phone-lines LAN system and distinguishing a valid signal and a collision backoff signal from noises in real time.

2. Related Art

Along with the prospering electronic IC industries and information technologies in recent years, network systems play an important role in daily life. In particular, because the phone-lines in home have already installed for general telephone network, it is convenience to use the same home phone-lines as the transmission medium in home local area network (hereinafter "HLAN") systems. Each computer in the HLAN system can install a receiver to receive the signals transmitted via the phone lines.

As shown in FIG. 1, a conventional receiver in a home phone-lines LAN system compliant with the HomePNA 2.0 specification comprises a QAM (quadrature amplitude modulation) demodulator 101 for providing the "I" and "Q" signals from signal frames; an equalizer 102 for compensating the "I" and "Q" signals for the distortion caused by transmission; a deconstellation 103 for converting the compensated "I" and "Q" signals into data signal D; a detector 104 for distinguishing the "valid signal frame" and "collision backoff signal frame" from noises and other interference: and a data reading module 105 for reading in subsequent data signal when the signal frame is a valid signal frame.

However, in a conventional receiver described above, because the detector 104 is connected to the deconstellation 103, it can distinguish the valid signal frame and the collision backoff signal frame from noises only after the demodulation by the QAM 101, the distortion compensation by the equalizer 102, and the conversion to a data signal D by the deconstellation 103. Nevertheless, when the received signal RS contain too much interference, it will take longer time for the equalizer 102 to compensate for the distortion and thus the system might not be able to receive the valid signal in time.

SUMMARY OF THE INVENTION

In view of the foregoing, it is an object of the present invention to provide a receiver for a home phone-lines LAN system containing a signal match filter module which detects a received signal and determines whether received signal is a valid signal, collision backoff signal, or noise in real time.

In accordance with an aspect of the present invention, the receiver for a home phone-lines LAN system of the present invention comprises a QAM demodulator for demodulating the received signal into "I" and "Q" signals; an equalizer connected to the QAM for compensating the "I" and "Q" signals for the distortion; a deconstellation connected to the equalizer for converting the compensated "I" and "Q" signals into data signal; a signal match filter module connected to the QAM demodulator for performing match operation to generate a match value; a detector connected to the signal match filter module for detecting the match value and outputting a frame type; and a data reading module connected to both the deconstellation and the detector for reading the transmission data when the frame type is a valid signal frame.

According to the receiver for a home phone-lines LAN system of the present invention, the signal match filter module comprises an adder connected to the QAM demodulator for adding up the "I" and "Q" signals to generate a combined signal; and at least one set of cross-correlator for performing correlation operation on the combined signal and outputs a match value.

According to the receiver for a home phone-lines LAN system of the present invention, each cross-correlator comprises a plurality of shift buffers for shifting the combined signal; a plurality of multipliers having an input to receive the value stored in each shift buffer for multiplying the value and an identification value; and an adder for adding up the output values of the plurality of multipliers to generate the match value.

According to the receiver for a home phone-lines LAN system of the present invention, each cross-correlator comprises a RAM module for storing the data of combined signal circularly; a ROM module for storing the data of identification value; a multiplier for multiplying the data output from the RAM module and the data output from the ROM module; an accumulator for accumulating the value output from the multiplier; and a controller for controlling the action of the signal match filter module.

These and additional objects and advantages, as well as other embodiments of the invention, will be more readily understood after a consideration of the drawings and the detailed description of the preferred embodiments.

DETAILED DESCRIPTION OF THE INVENTION

The structure and operation principles of the receiver for a home phone-lines LAN system according to the present invention will be hereinafter described in detail in conjunction with the accompanying drawings.

Figure 2:
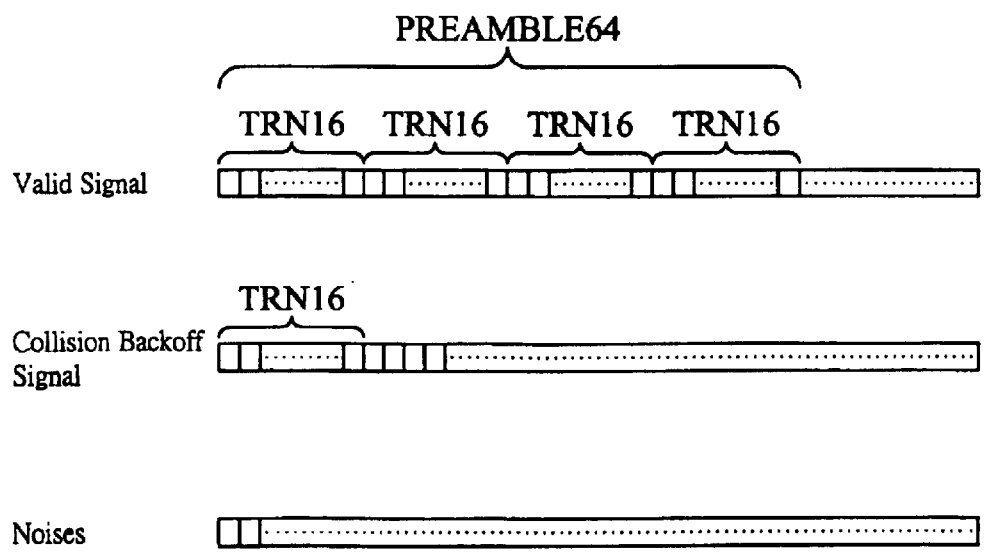
FIG. 2 is a schematic view of the preambles of a valid signal, a collision backoff signal, and a noise signal, respectively, in a home phone-line network system with the HomePNA 2.0 specification.

As shown in FIG. 2, in a home phone-line network system compliant with the HomePNA 2.0 specification, each valid signal frame contains 64 bits of preamble signal PRE64, and each preamble signal contains four sets of identical 16 bits of identification code TRN16. Each collision backoff signal contains 20 bits of collision backoff code, but only the first set of 16 bits contains 16 bits of identification code TRN16. The noise and other interference signals do not contain any identification code TRN16. Therefore, detecting the appearance frequency of the identification code TRN 16 in each signal frame can effectively distinguish the valid signal and collision backoff signal from noises.

Figure 1:
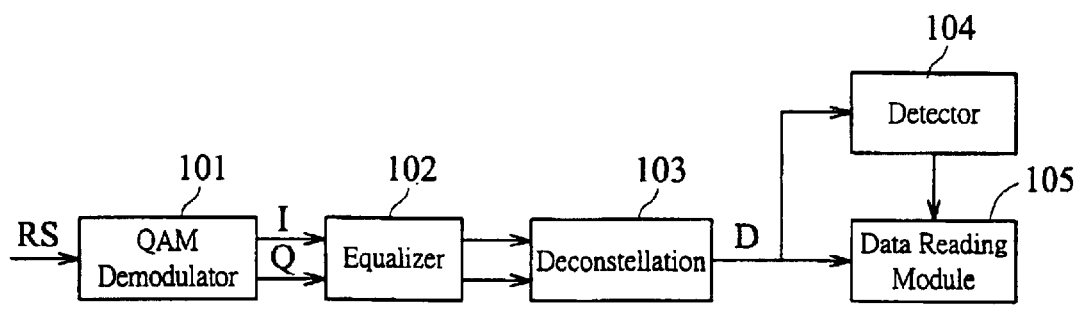
FIG. 1 is a system block diagram of a conventional home receiver for a home phone-lines LAN system.
Figure 3:
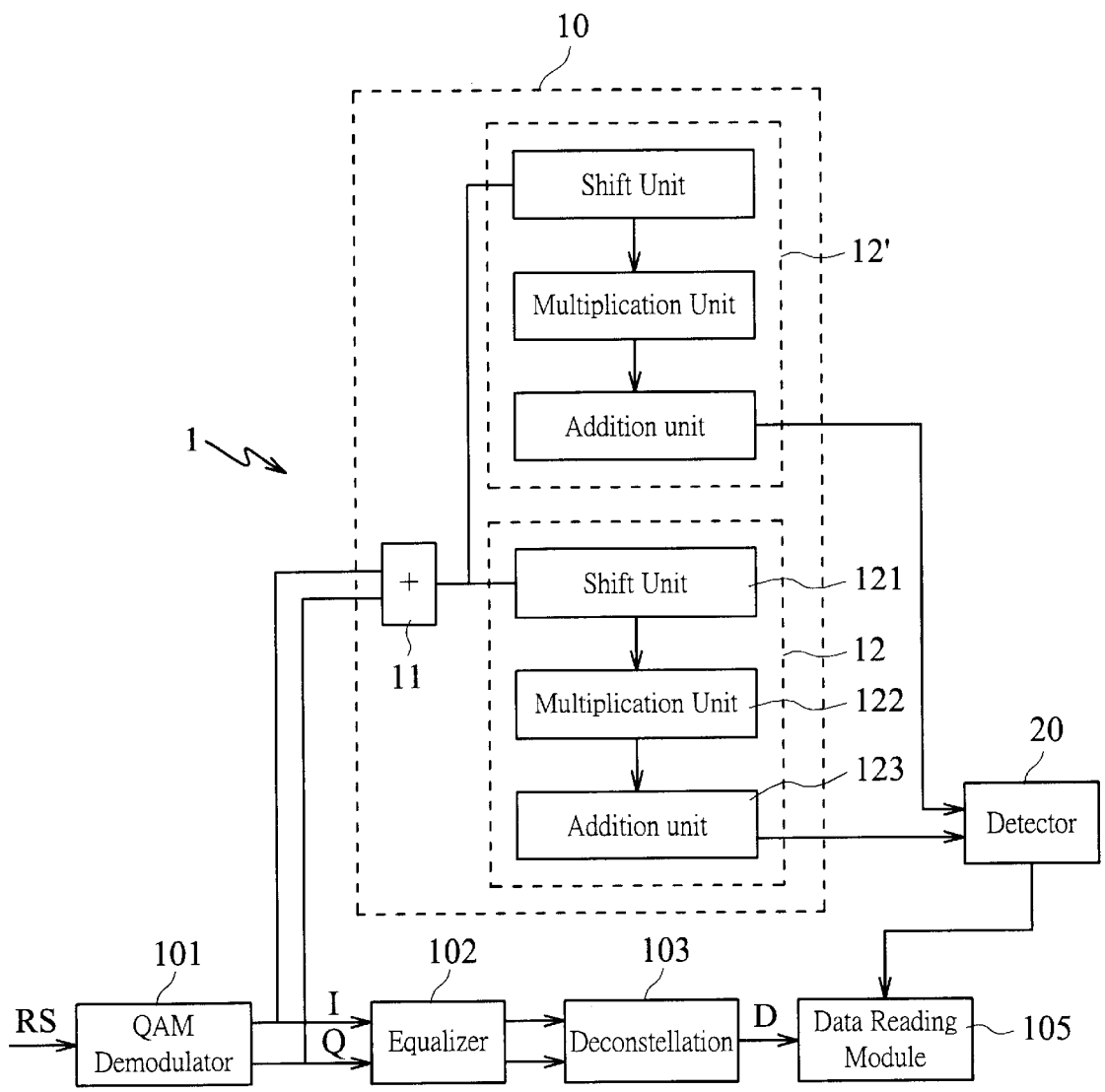
FIG. 3 is a system block diagram of a receiver for a home phone-lines LAN system of the present invention.

FIG. 3 is a block diagram of a receiver 1 in a home phone-lines LAN system of the present invention. As shown in the drawing, the receiver 1 is generally similar to a conventional receiver (referring to FIG. 1) and also contains a QAM demodulator 101, an equalizer 102, a deconstellation 103 and a data reading module 105. Therefore, the detailed description of the structures and functions of these devices are omitted. Nevertheless, the receiver 1 of the present invention further comprises a signal match filter module 10 connected to the QAM demodulator 101 and a detector 20 connected to the signal match filter module 10. Since the signal match filter module 10 is connected directly to the QAM demodulator 101, it can immediately detect any identification code TRN 16 without waiting for the compensation of the equalizer 102.

The signal match filter module 10 comprises an adder 11 and two sets of cross-correlators 12, 12'. The adder 11 adds up the "I" signal and the "Q" signal and outputs a combined signal. Each of the cross-correlators 12, 12' performs a match operation, such as a comparison operation or a correlation operation, on the combined signal and an identification value and outputs a match value to the detector 20. The identification value corresponds to the identification code TRN16. Since the identification code TRN16 is converted to the "I" signal and the "Q" signal after constellation, thus the identification value also has different settings corresponding to the "I" signal and the "Q" signal, respectively.

Figure 4:
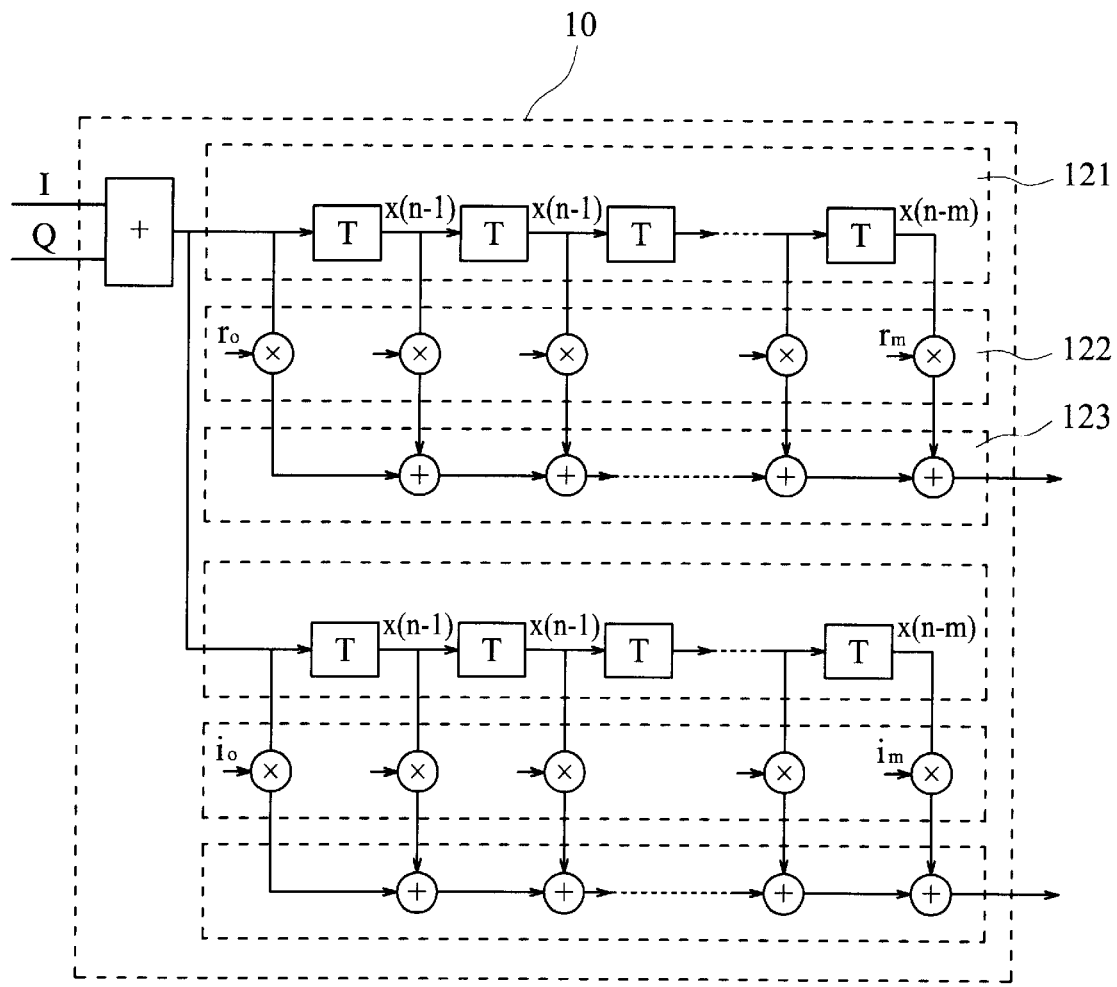
FIG. 4 shows a detailed structure of the signal match filter module in a receiver for a home phone-lines LAN system according to the present invention.

Please refer to FIG. 4 for an example structure of the signal match filter module 10. Since the cross-correlator 12 and the cross-correlator 12' have the same structure, only the structure of the cross-correlator 12 is described hereinafter. It is noted that the cross-correlator 12 and the cross-correlator 12' have different identification value. As shown in FIG. 4, the cross-correlator 12 of the signal match filter module 10 includes a shift unit 121, a multiplication unit 122 and an addition unit 123. The shift unit 121 has fifteen stages of shift buffers connected in series and the input of the shift unit 121 is connected to the adder 11 to receive data of the combined signal. The data inputted to the shift unit 121 are sequentially shifted to the next shift buffer one by one according to the clock of the combined signal. The multiplication unit 122 multiplies the identification value with the data stored in the shift unit 121. The addition unit 123 then adds up all the output values from the multipliers and sends the result, match value, to the detector 20.

Figure 5:
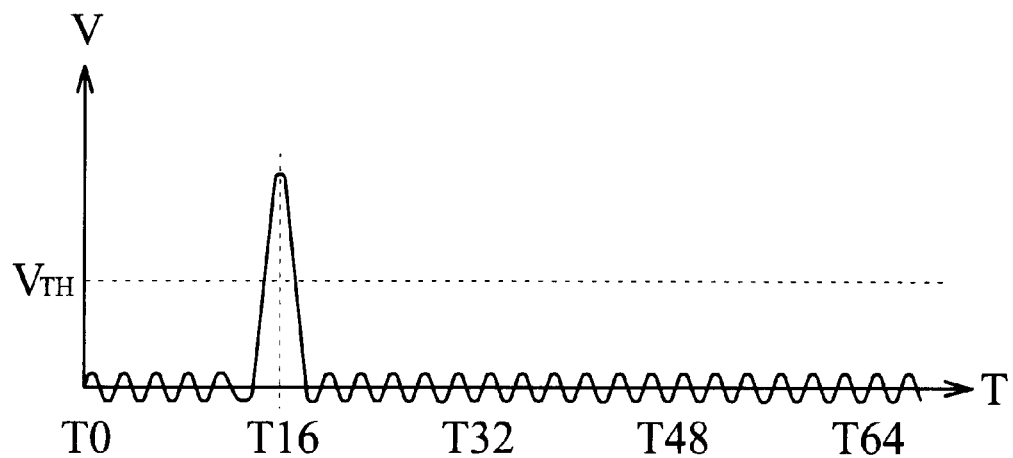
FIG. 5 shows the output wave when the signal match filter module detects a collision backoff signal.
Figure 6:
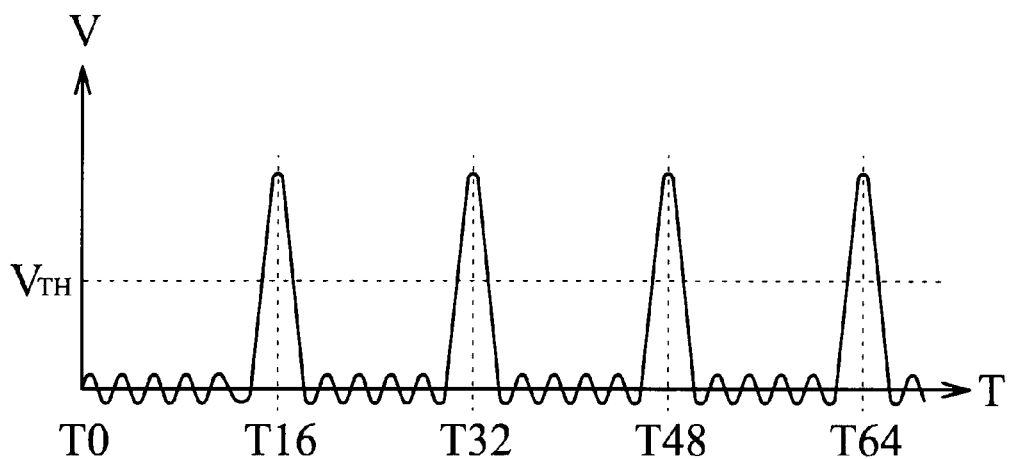
FIG. 6 shows the output wave when the signal match filter module detects a valid signal.

For illustration purpose, FIGS. 5 and 6 show the output waves from the signal match filter module 10 of the receiver 1 according to the present invention. FIG. 5 shows the output wave when the signal frame is a collision backoff signal frame; and FIG. 6 shows the output wave when the signal frame is a valid signal frame. The identification values in correlator 12 and 12' are designed to be identical to the "I" signal and "Q" signal converted from the identification code TRN16, respectively, and the signal match filter module 10 utilizes correlation as the match operation. Therefore, the output value of the addition unit 123 will be the largest value, when signal match with the identification code TRN16. Since there is only one set of identification code TRN16 in the collision backoff signal, one spike-like pulse is produced in the signal match filter module 10 output for the collision backoff signal, as shown in FIG. 5. On the contrary, when the transmission signal is a valid signal frame, which contains four sets of identification codes TRN 16, thus there are four sequent spike-like pulses in the output from the signal match filter module 10.

Therefore, once the detector 20 detects a signal spike-like pulse, the signal frame is a collision backoff signal frame; whereas if continuous spike-like pulses are detected, the received frame is a valid signal frame. Using this method can inform the data reading module 105 the frame type in real time, so the data reading module 105 can read in the data in time when the signal frame is a valid signal frame.

It is noted that the signal might be distorted during transmission, thus not all the outputs from the signal match filter module 10 reach the maximum. A threshold value Vth can be assigned to the detector 20 so that all signals exceeding the threshold value Vth would be considered as spike-like pulses. Thus, the detector 20 will not miss any spike-like pulse.

Figure 7:
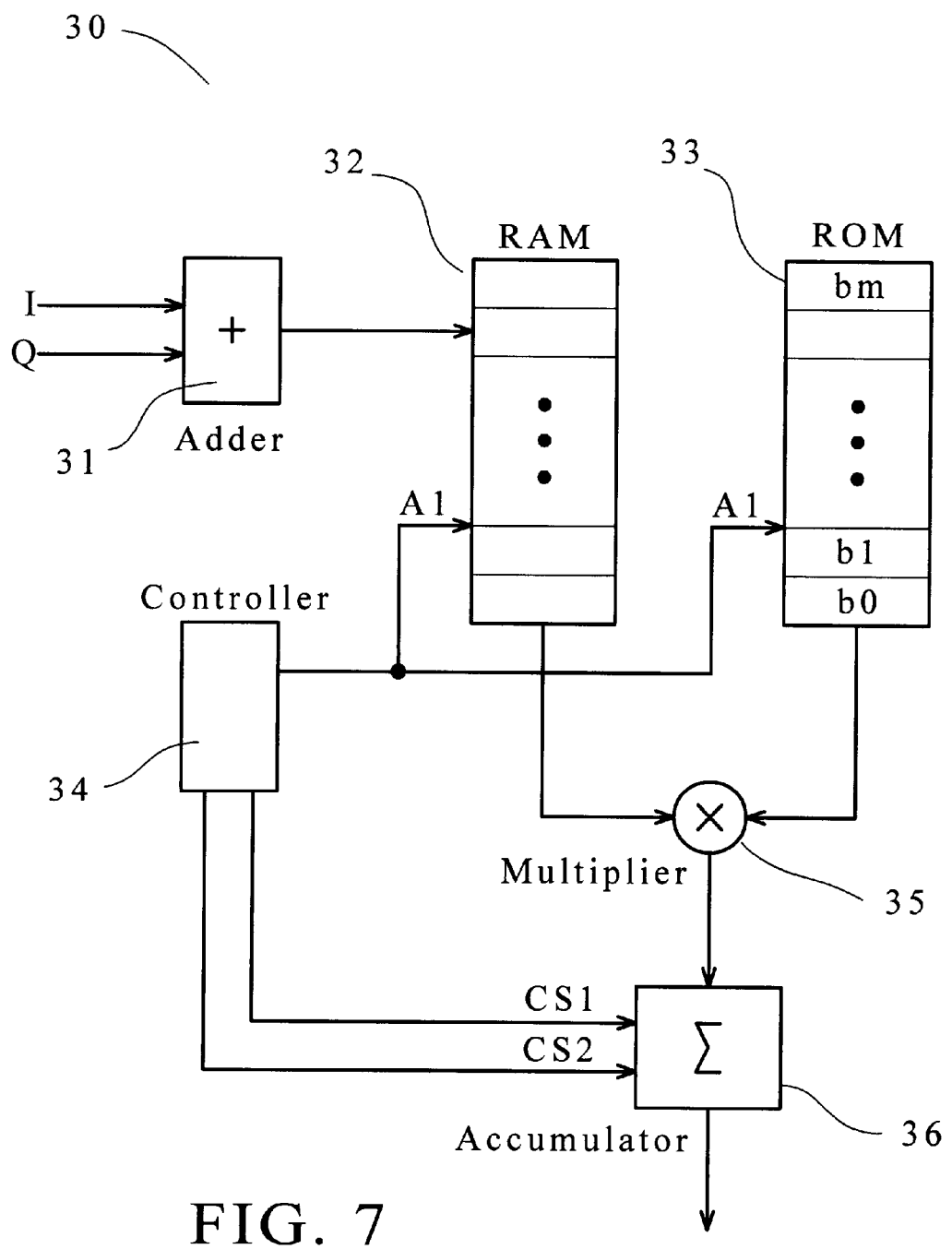
FIG. 7 shows the other structure of the signal match filter module in a receiver for a home phone-lines LAN system according to the present invention.

Referring to FIG. 7, it shows the other structure of the signal match filter module. The signal match filter module 30 comprises an adder 31 for adding up the "I" signal and "Q" signal as a combined signal; a RAM 32 for storing the data of the combined signal circularly; a ROM 33 for storing the identification value; a multiplier 35 for multiplying the value output from the RAM 32 and the value output from the ROM 33; an accumulator 36 for accumulating the value output from the multiplier 35; and a controller 34 for controlling the action of the signal match filter module 30. The RAM 32 and the ROM 33 have the same size, for example 16 units in this embodiment, to store the combined data and identification value, respectively. For each data cycle T (referring to FIG. 5, each TRN 16 having 16 cycle), the data of combined signal is stored in the RAM 32 and then the RAM 32 and the ROM 33 output data to the multiplier 35 in the same time one by one according to addressing bus A1 from the controller 34. Meanwhile, the accumulator 36 accumulates each value output from the multiplier 35 during this cycle T and send the result, match value, to the detector 20. The controller 34 further provides control signal CS1 and CS2 to clock and reset the accumulator 36.

The home receiver for a home phone-lines LAN system of the present invention contains a signal match filter module directly connected to the QAM demodulator, so the signal frame can be identified as a collision backoff signal when a single identification code enters and as a valid signal when successive identification codes enter. Therefore, the detector of the present invention can quickly distinguish the valid signal, collision backoff signal from noises and other interference signals. Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention. For example, a DSP (Digital signal processor) the cross-correlator can be to perform the match operation.

What is claimed is:

1. A receiver in a home phone-lines local area network system, comprising:

a QAM demodulator for demodulating a received signal into an "I" signal and a "Q" signal;

an equalizer connected to said QAM demodulator for compensating the "I" signal and "Q" signal for distortion;

a deconstellation connected to said equalizer for converting the equalized "I" signal and the equalized "Q" signal into a data signal;

a signal match filter module connected to said QAM demodulator for performing a match operation to generate a match value;

a detector connected to said signal match filter module for detecting a frame type of the received signal according to the match value; and a data reading module connected to said deconstellation and said detector for reading in the data signal when the frame type is a valid signal frame.

2. The receiver according to claim 1, wherein said signal match filter module comprises:

an adder connected to said QAM demodulator for adding up the "I" signal and the "Q" signal to generate a combined signal; and at least cross-correlator connected to said adder for performing a correlation operation on the combined signal and an identification value.

3. The receiver according to claim 2, wherein said signal match filter module includes two sets of cross-correlators with different identification values.

4. The receiver according to claim 2, wherein each said cross-correlator comprises:

a plurality of shift buffers connected in series and having an input connected to the combined signal for sequentially shifting the combined signal to the next shift buffer;

a plurality of multipliers connected to said plurality of shift buffers for multiplying values stored in each said shift buffer and the identification values; and an addition unit connected to said plurality of multipliers for adding up the output values of each said plurality of multipliers to generate the match value.

5. The receiver according to claim 2, wherein each said cross-correlator comprises:

a RAM module for storing data of the combined signal circularly;

a ROM module for storing data of the identification value;

a multiplier for multiplying the data output from said RAM module and the data output from said ROM module;

an accumulator for accumulating the value output from the multiplier to generate the match value; and, a controller for controlling the action of said signal cross-correlator.

6. The receiver according to claim 1, wherein said detector detects a number of times that the match value exceeds a threshold value within a signal frame.

7. The receiver according to claim 6, wherein said frame type is a collision backoff signal frame when said number of times is 1.

8. The receiver according to claim 6, wherein said frame type is a valid signal frame when said number of times is greater than 1.

* * * * *